July 25, 1961 P. HOPPE ET AL 2,993,233
APPARATUS AND PROCESS FOR MAKING COMPOSITE STRUCTURES
Filed March 11, 1957

INVENTORS
PETER HOPPE
HANS WILLI PAFFRATH
BY
Clelle W. Upchurch
ATTORNEY

United States Patent Office 2,993,233
Patented July 25, 1961

2,993,233
APPARATUS AND PROCESS FOR MAKING COMPOSITE STRUCTURES
Peter Hoppe, Troisdorf, and Hans-Willi Paffrath, Koln-Deutz, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed Mar. 11, 1957, Ser. No. 645,291
Claims priority, application Germany Mar. 27, 1956
2 Claims. (Cl. 18—26)

This invention relates generally to an apparatus for making composite structures and, more particularly, to an apparatus for making improved composite structures having a cellular plastic and especially a cellular polyurethane plastic interior.

It has been proposed heretofore to make composite srtuctures having an external layer of metal, wood, paper, plastic or similar material and an internal area filled with a cellular plastic. In making such structures, metal or other material is shaped into the desired configuration and is provided with a cavitated interior. This interior is then filled with a cellular plastic material. It has been found that cellular plastics formed by reacting a polyhydroxy compound with a polyisocyanate to form a cellular polyurethane plastic is particularly advantageous as the interior of such composite structures because the cellular polyurethane plastic may be bonded to the inner layer of the surface material. Mixtures of polyhydroxy compounds and polyisocyanates which produce a rigid foam or cellular plastic are preferred because such materials tend to increase the strength of the composite structure. In order to further improve the strength of the composite structure, the inner surfaces of the covering layers are frequently provided with an insert of fabric or other type fibrous matter which lies against the inner surface of the covering layer. These mats must be sufficiently porous to permit penetration by the reaction mixture as the foaming progresses in order that the cellular plastic will become bound to the inner wall of the covering layers. Such a process produces a product in which the area along the inner wall of the covering layer is of higher density than the density of the cellular plastic nearer the center of the composite structure. Although the composite structures made in this way have many advantages, it has been found that the hollow elements must be filled rather slowly in order to bring about proper penetration of the mats by the reaction mixture with the mats pulling away from the inner surface of the covering layers. Mixing devices, such as, for example, the one disclosed in the Hoppe patent U.S. 2,764,565, produced large volumes of reaction mixture at rapid rates and considerable difficulty has been experienced in using machines of this type for filling the cavity of hollow objects because the relatively thin liquid foam mixture rapidly penetrates the fiber mat and forces it away from the inner surface of the covering layer. As soon as the mat is moved from the inner surface of the covering layer, it begins to float in the reaction mixture and does not remain near the inner wall of the covering layer and consequently does not serve as a reinforcement of the covering layer.

It is therefore an object of this invention to provide an apparatus and method for mixing the components of a polyurethane cellular plastic and for transferring the resulting mixture into the cavity of hollow structures having reinforcing mats. Another object of the invention is to provide an apparatus and method for filling the cavity of hollow objects with cellular plastic foam without disturbing reinforcing mats adjacent the inner wall of the hollow structure. Still another object of the invention is to provide a method for using high-speed mixing apparatus for filling the cavity of a hollow structure having reinforcing mats adjacent the inner wall of the structure. A still further object of the invention is to provide improved composite structures having a cellular plastic core and reinforcing mats lying adjacent the inner wall of the covering layer of the structure. Another object of the invention is to provide an improved apparatus for filling hollow structures with cellular polyurethane plastic.

Other objects will become apparent from the following description with reference to the accompanying drawing in which FIGURE 1 is a diagrammatic illustration of one embodiment of the invention employing an intermediate storage vessel between the mixing nozzle and the shaping apparatus;

Figure 1:
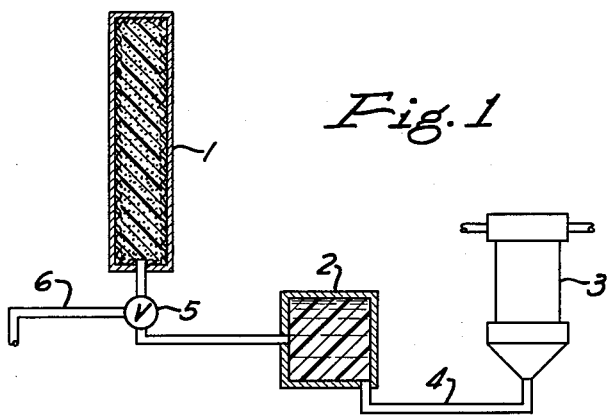

The foregoing objects as well as others are accomplished, generally speaking, in accordance with this invention by providing an apparatus and method for confining a polyurethane cellular plastic reaction mixture until the reaction has begun and some carbon dioxide has been evolved and thereafter injecting the partially reacted mixture into the cavity to be filled with solidified cellular polyurethane plastic. It has been found that composite structures may be manufactured with reinforcing layers or marginal zones adjacent the inner wall of the covering layer and with a cellular polyurethane plastic core if the reaction mixture is permitted to react for a short period of time before it is introduced into the cavity to be filled. The foamable mixture at the time it is introduced into the cavity has a creamy consistency caused by entrapped carbon dioxide produced from chemical reaction between the polyisocyanate and the water used to produce the polyurethane foam.

A creamy consistency of the foamable mixture is understood to be attained when the viscosity of the mixture in the course of the polyaddition process is increased to such an extent that the bubbles of carbon dioxide evolved in the process are entrapped in the expanding mixture. The time or the viscosity at which this desired state is reached cannot easily be defined in minutes, centistokes or the like since it is highly depending on the foam formulation used. It could better be said that about 5–15% of the foamable mixture involved has already reacted when the creamy consistency is attained.

This creamy mixture first fills all the internal space within the object and defined by the reinforcing mats and then, as the reaction continues, the foaming mixture penetrates the porous mats. However, since some of the chemical reaction has been brought about externally of the article to be filled, penetration of the mats is retarded and chemical reaction after penetration is negligible, so very little gas is produced and very little pressure is asserted against the inner wall of the covering layers. Consequently, the mats are not forced away from the covering layers.

The reinforcing mats are adhesively bound to the wall of the structure, preferably with an isocyanate-polyhydroxy compound base adhesive but penetration of the mats by the foam has resulted frequently in separation of the mats from the walls.

It has been found that the method of filling cavitated articles is particularly advantageous for making cellular plastic plates and dish-shaped elements of large size, such as, for example, articles having a height of about 2 meters or more and large core areas of from about 20 to about 60 mm. In spite of the fact that the foam must rise to great heights in order to fill the cavitated articles, the core formed in accordance with this invention has a substantially uniform structure because the partially reacted creamy mixture is substantially less sensitive to movements, that is, rising movements and lateral flowing movements, than a thin liquid reaction mixture such as emerges from the mixing nozzle of the type disclosed in the aforesaid Hoppe patent.

In carrying out the process provided by this invention, the foamable reaction mixture emerging from a mixing machine is permitted to stand for a short period of time after it has left the mixing device and before it is introduced into the cavity to be filled with solidified cellular polyurethane plastic. In one advantageous embodiment of the invention, an overflow system is provided which, in one simplified form, has an overflow chamber between the outlet of the mixer and the hollow structure to be filled. In another embodiment of the invention, the overflow system may be a conduit or pipe which extends into the hollow object and is of such length that some chemical reaction proceeds before the mixture is discharged into the cavitated article. It is also possible to provide confining means within the cavity itself by constructing confining means within the cavity where a creamy mass is formed before the reaction mixture is discharged through slots into the areas where the marginal zone reinforcing mats lie. Indeed, any suitable means for insuring that the reaction mixture has reacted to the point where a creamy mass is formed before it is discharged into the area of the reinforcing mats may be utilized.

Referring now to the drawing, FIGURE 1 is an illustration of one embodiment of the invention in which 3 is a diagrammatic illustration of a suitable mixing device which may be the apparatus disclosed in the aforesaid Hoppe patent or any other suitable apparatus for mixing the chemical components of a polyurethane cellular plastic together. The reaction mixture is discharged from mixing device 3 through conduit 4 into a suitable chamber or tank 2. The volume of tank 2 should be such that chemical reaction proceeds to the point where a creamy mass is formed before the reaction mixture is discharged from tank 2 into the shaping means 1. Valve 5 is provided to permit discharge of the pressure from tank 2 through conduit 6 after article 1 has been filled.

Figures 2, 4:
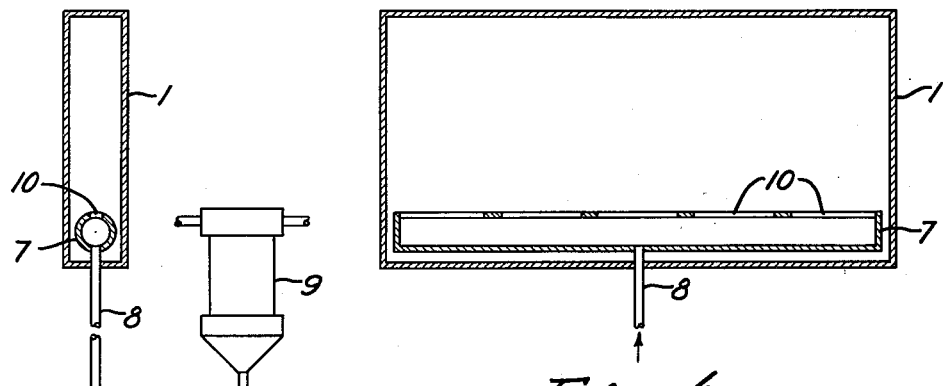
FIGURE 2 illustrates diagrammatically another embodiment of the invention in which losses of reaction mixture are negligible.
FIGURES 4 and 5 are longitudinal sectional views of the embodiments shown in FIGURES 2 and 3 respectively.

In the embodiment shown in FIGURE 2, mixing device 9 is connected to cavitated article 1 by means of a union 8 which extends into pipe 7 located in the cavity of article 1. The volume of pipe 7 is such that some chemical reaction occurs before the mixture is discharged through slots 10 therein. The apparatus illustrated in FIGURE 2 avoids losses in reaction mixture after the cavitated article has been filled. The reaction mixture entering the tube 7 will first of all be distributed therein and only after tube 7 has been filled will the reaction mixture pass through slots 10 into the cavity of article 1. The system shown in FIGURE 2 has been found to be particularly advantageous for filling the cavities of large flat objects having a core thickness of from about 20 to about 60 mm., such as, for example, refrigerator doors, refrigerator housings, walls, ceilings, roofs of houses or other panels of large sizes.

Figure 3:
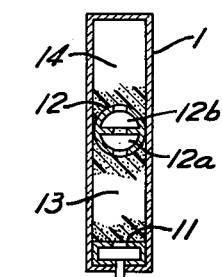
FIGURE 3 is a diagrammatic illustration of another embodiment of a shaping mold provided by the invention.
Figure 5:
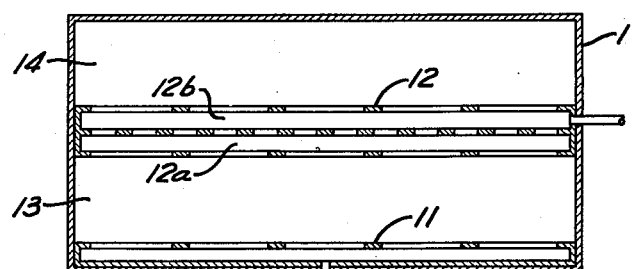

As illustrated in FIGURE 3, the storage compartment or chamber may be made an integral part of the hollow article. In the embodiment shown in FIGURE 3, a marginal section 11 which may be a compartment extending through one end of the hollow article is provided with slots through which the foam may pass into the cavity of the article. The cavitated article may also be furnished with one or more circular compartments 12 which may be used in conjunction with compartment 11 or may be used alone for filling large cavitated articles. The compartment 12 shown in FIGURE 3 is composed of two sections 12a and 12b. Slots are provided through which the foam may move into parts 13 and 14 of the cavitated article. In a cavitated article of this type, the creamy reaction product is formed in the compartments 11 and 12 and the reaction mixture introduced into the cavities 13 and 14 contains an appreciable quantity of carbon dioxide evolved during the reaction of the polyhydroxy compound with the polyisocyanate.

The apparatus and method provided by this invention may be used for filling hollow objects with any suitable reaction mixture that will produce a cellular polyurethane plastic. This reaction mixture may contain as the polyhydroxy compound a polyester, a polyalkylene ether glycol, a polyalkylene thioether glycol or mixtures thereof or any other suitable polyhydroxy compound which will react with a polyisocyanate to form a cellular polyurethane plastic. The various dicarboxylic acids disclosed in the aforesaid Hoppe patent, including adipic acid, succinic acid, maleic acid and the like, may be reacted with one of the polyhydric alcohols disclosed in the aforesaid Hoppe patent or other polyhydric alcohol to form the polyester. Preferably the polyester should be formed from an excess of the polyhydric alcohol in order that it will have terminal hydroxyl groups. Examples of suitable polyhydric alcohols include ethylene glycol, trimethylol propane, glycerin, diethylene glycol and the like. The polyethers may be formed by condensing any suitable alkylene ether glycol by polymerization of alkylene oxides or by reaction of alkylene oxides with polyhydric alcohols. The polyalkylene thioether glycols may be formed by condensing a glycol with any suitable thioether glycol, such as, for example, thiodiglycol, 3,3′-dihydroxypropyl sulfide, 4,4′-dihydroxybutyl sulfide, and similar dihydroxy alkylene sulfides, or from mixed aromatic, aliphatic thioether glycols, such as, for example, 1,4-($\beta$-hydroxyethyl)-phenylene dithioether and various other thioether glycols of the naphthalene and diphenylmethane series, and the like.

Any suitable polyisocyanate may be utilized for reacting with the polyhydroxy compound, including, for example, 2,4-toluylene diisocyanate, 2,6-toluylene diisocyanate, cyclohexane-1,4-diisocyanate, p,p′-diphenylmethane diisocyanate, triphenylmethane-triisocyanate and various other organic polyisocyanates, including those disclosed in the aforesaid Hoppe patent.

Any suitable activator mixture, such as, for example, one containing a tertiary amine catalyst, may be added to the reaction mixture to modify the reaction rate.

In order better to describe and further clarify the invention, the following is a description of embodiments of the invention. In each embodiment, the reaction mixture is formed from the components by mixing them together in an apparatus which will bring about complete mixing before any substantial amount of chemical reaction has occurred. The apparatus disclosed in the Hoppe Patent 2,764,565 may be used for making the mixture. After complete mixing in the mixing device, the reaction mixture is then transferred to a chamber where chemical reaction occurs until a creamy mass has been formed and that creamy mass is then introduced into the cavity to be filled with the solid rigid polyurethane cellular plastic. The reaction mixtures in the following examples may be used in conjunction with the apparatus shown in the drawing.

The parts given in the following examples are by weight.

*Example 1*

A foamable mixture consisting of:
100 parts of a polyester prepared from—
    5 mols of adipic acid,
    12 mols of phthalic acid anhydride, 6 mols of oleic acid and
35 mols of trimethylol propane
  by thermal condensation
2 parts of silicic acid aerogel
3 parts of N-diethyl-β-phenoxethyl amine
4 parts of the sodium salt of a sulfonated castor oil (water content 54%)
1 part of pentamethyl-diethylene-triamine and
85 parts of toluylene diisocyanate is prepared in a mixing device such as, for example, that disclosed in the Hoppe Patent 2,764,565. The mixture is partially reacted to about 10% and transferred to the hollow object to be filled. By one of the methods provided by this invention inside the hollow object the mixture expands to fill the cavity without separating the reinforced mats from the inner walls of the object.

*Example 2*

A foamable mixture consisting of:

100 parts of a branched polythioether with an OH number of 263, made from—
  4 mols of thiodiglycol,
  2 mols of trimethylol propane and
  1 mol of ethoxylated hydroquinone,
2 parts of hexahydrodimethyl aniline,
2 parts of Turkey red oil,
10 parts of silicic chalk,
2 parts of trimethylol propane, ethoxylated with 12 mols of ethylene oxide and
54 parts of toluylene diisocyanate is prepared in a mixing device such as, for example, that disclosed in the Hoppe Patent 2,764,565. The mixture is partially reacted for about 10% and transferred to the hollow object to be filled. By one of the methods provided by this invention inside the hollow object the mixture expands to fill the cavity without separating the reinforced mats from the inner walls of the object.

As indicated in the foregoing embodiments, various types of reinforcing mats may be utilized. Suitable porous mats include layers of Fiberglas, porous fabric mats, woven mats made from straw, wood shavings or the like. A catalyst is usually added in the reaction mixture and this catalyst may be any suitable chemical compound which modifies the rate of reaction between the polyisocyanate and the polyhydroxy compound. Examples of suitable catalysts are the tertiary amines and other catalysts and activator mixtures disclosed in the aforesaid Hoppe patent.

The composition of the covering layer of the composite article may vary from wood, metal, plastic or any other suitable material suitable for forming the hollow structure.

Although the invention has been described in considerable detail in the foregoing for the purpose of illustration, it is to be understood that variations can be made by those skilled in the art without departing from the spirit or scope of the invention except as may be set forth in the claims.

What is claimed is:

1. An apparatus for making shaped cellular polyurethane products comprising a mixing chamber adapted to mix liquid chemical components which will react to form a cellular polyurethane plastic, means for continually delaying the flow of the resulting mixture until reaction has begun and some carbon dioxide has been evolved, said means comprising an overflow chamber having a top and a bottom, an open inlet means for said mixed liquid chemical components in the bottom thereof and an open outlet means for the partially reacted components adjacent the top thereof, means for shaping said reaction mixture and means between said chamber and said shaping means for introducing the mixture into the last said means.

2. A method for filling the cavity of an article with a cellular polyurethane plastic, said cavity having porous reinforcing mats lying against the inner wall thereof comprising mixing the components of a polyurethane plastic together and introducing said mixture into said cavity of said article only after at least some reaction has occurred between the components and bubbles of carbon dioxide have been produced and become entrapped in the reaction mixture, said bubbles in the reaction mixture retarding the penetration of said mats whereby said mats are prevented from moving away from said inner wall of said cavity.

References Cited in the file of this patent

UNITED STATES PATENTS

| | | |
|---|---|---|
| 274,728 | Crutsinger | Mar. 27, 1883 |
| 830,432 | Hennessey | Sept. 4, 1906 |
| 1,379,109 | Kutner | May 24, 1921 |
| 2,207,426 | Bailey | July 9, 1940 |
| 2,515,250 | McIntire | July 18, 1950 |
| 2,639,252 | Simon et al. | May 19, 1953 |
| 2,700,178 | Blake | Jan. 25, 1955 |
| 2,728,702 | Simon et al. | Dec. 27, 1955 |
| 2,764,565 | Hoppe et al. | Sept. 25, 1956 |
| 2,770,241 | Winkler | Nov. 13, 1956 |
| 2,829,117 | Lindermann | Apr. 1, 1958 |

OTHER REFERENCES

Raskin: From Jets to Jewels, "Chemical and Engineering News," volume 34, No. 21, pages 2492–2498, May 21, 1956.